United States Patent [19]

Okamoto et al.

[11] Patent Number: 5,477,478
[45] Date of Patent: Dec. 19, 1995

[54] ORTHOGONAL TRANSFORM PROCESSOR

[75] Inventors: Kiyoshi Okamoto; Yoshifumi Matsumoto; Masaki Toyokura, all of Osaka, Japan

[73] Assignee: Matsushita Electric Industrial Co., Ltd., Osaka, Japan

[21] Appl. No.: 364,037

[22] Filed: Dec. 27, 1994

[30] Foreign Application Priority Data

Dec. 27, 1993 [JP] Japan ............................ 5-330094
Dec. 12, 1994 [JP] Japan ............................ 6-307244

[51] Int. Cl.⁶ .................................................. G06F 15/332
[52] U.S. Cl. ............................ 364/725; 364/726; 395/375
[58] Field of Search ..................... 395/800, 400, 395/375; 364/725, 726

[56] References Cited

U.S. PATENT DOCUMENTS

| | | | |
|---|---|---|---|
| 4,791,598 | 12/1988 | Liou et al. | 364/725 |
| 5,093,801 | 3/1992 | White et al. | 364/726 |
| 5,103,419 | 2/1993 | Toyokura et al. | 364/750.5 |
| 5,191,548 | 3/1993 | Balkanski et al. | 364/725 |
| 5,278,781 | 1/1994 | Aono et al. | 364/736 |
| 5,293,596 | 3/1994 | Toyokura et al. | 395/400 |
| 5,299,320 | 3/1994 | Aono et al. | 395/375 |

FOREIGN PATENT DOCUMENTS

| | | |
|---|---|---|
| 3-35353 | 2/1991 | Japan . |
| 3-214256 | 9/1991 | Japan . |
| 4-277932 | 10/1992 | Japan . |

*Primary Examiner*—Alyssa H. Bowler
*Assistant Examiner*—John Follansbee
*Attorney, Agent, or Firm*—Willian Brinks Hofer Gilson & Lione

[57] ABSTRACT

The output of a butterfly unit is entered into a product-sum unit in a forward DCT and the output of the product-sum unit is entered into the butterfly unit in an inverse DCT. The product-sum unit employs, as a bit-string distribution circuit, a register circuit having eight bit shift registers each having a 16-bit parallel input and a 2-bit shift output and the bit shift registers are different in bit width from one another. Data are entered into the bit shift registers with the largest bit-width bit shift register first, such that the respective bit shift registers are shifted rightward by 2 bits per cycle. Four shift registers are disposed between the bit-string distribution circuit and a RAG circuit such that, when bit strings are entered, as delayed cycle by cycle, into eight RAGs of the RAC circuit, the final accumulation results are successively provided from the RACs in a proper order. This reduces the bi-directional DCT processor in circuit arrangement.

3 Claims, 12 Drawing Sheets

ORTHOGONAL TRANSFORM PROCESSOR

BACKGROUND OF THE INVENTION

The present invention relates to a processor-for transforming time domain signals into frequency domain signals, or frequency domain signals into time domain signals, by means of an orthogonal transform such as a discrete Fourier transform (hereinafter referred to as DFT), a discrete cosine transform (hereinafter referred to as DCT) or the like.

Recently, a fast and small-sized circuit for achieving an orthogonal transform is needed as an important part of a method of compressing and coding image information, audio information or the like with high efficiency. A forward orthogonal transform is required in an encoder, while an inverse orthogonal transform is required in a decoder. U.S. Pat. No. 4,791,598 discloses the inner arrangement of a one-dimensional DCT processor serving as an orthogonal transform processor. This one-dimensional DCT processor employs technique of the first stage decimation-in-frequency and technique of distributed arithmetic for obtaining vector inner products without the use of multipliers. The decimation-in-frequency is known technique for reducing the number of required multiplications in a fast Fourier transform (hereinafter referred to as FFT) which is a fast algorithm of the DFT.

More specifically, the Nx1 DCT processor in U.S. Pat. No. 4,791,598 has an input shift register and a holding register as set forth below. The input shift register comprises N input registers (each having a M-bit width) so connected in cascade to one another as to successively enter N word data which form an input vector comprising one row or column out of one block having N×N word (M bits/word) data. The holding register comprises N bit shift registers (each having a M-bit width) having (i) inputs respectively connected to the corresponding input registers of the input shift register such that the inputs receive in parallel the N word data from the input shift register each time all the N input registers of the input shift register are filled up with data, and (ii) outputs for shifting out one bit per cycle as part of an N-bit bit-slice word. These input shift register and holding register form a bit-string distribution circuit with a size of 2×N×M bits.

The N×1DCT processor in U.S. Pat. No. 4,791,598 further comprises a butterfly unit and a ROM-and-accumulator circuit (hereinafter referred to as RAC circuit) as set forth below. In order to execute the first stage decimation-in-frequency operation, the butterfly unit comprises N/2 serial adders and N/2 serial subtracters connected to the outputs of the holding register such that there are produced a pair of N/2-bit words from the N-bit bit-slice word received from the holding register. For example, there are executed butterfly operations of x1+x8, x1−x8, x2+x7, x2−x7, x3+x6, x3−x6, x4+x5, x4−x5 for a data string comprising eight data of x1, x2, x3, x4, x5, x6, x7, x8. The RAC circuit comprises N ROMs and accumulators (hereinafter referred to as RACs) connected to the output of the butterfly unit. Each of the N RACs comprises (i) at least one ROM which contains, in the form of a look-up table, the partial sums of vector inner products based on a discrete cosine matrix, and (ii) an accumulator for adding, with the digits aligned, the partial sums successively retrieved from the ROM with the bit-slice words serving as addresses. The RAC circuit forms a distributed arithmetic circuit for concurrently calculating N vector inner products using no multipliers.

The N×1DCT processor in U.S. Pat. No. 4,791,598 further comprises an output shift register as set forth below. The output shift register comprises N output registers which are so connected to the corresponding accumulators of the N RACs as to receive, in parallel, N vector inner products from the RAC circuit and which are so connected in cascade to one another as to successively supply the N vector inner products thus received.

As thus discussed, the conventional DCT processor has a large-scale circuit arrangement having a large number of registers. This produces the problem that integrated processors require large chip area.

SUMMARY OF THE INVENTION

It is an object of the present invention to provide an orthogonal transform processor smaller in size than a conventional one.

In the orthogonal transform processor of the present invention, a first address generator operates such that data are illustratively read from a first memory in the order of x8, x1, x7, x2, x6, x3, x5, x4 for a forward orthogonal transform, and thus obtained data string is supplied to a butterfly unit. This reduces in number the registers required for a decimation-in-frequency operation for a forward orthogonal transform.

The orthogonal transform processor of the present invention employs, as a bit-string distribution circuit, a register circuit comprising illustrative eight bit shift registers each having a 16-bit parallel input and a 2-bit shift output and the bit shift registers are different in bit width from one another. This reduces the bit-string distribution circuit in size to 8×16+(14+12+. . . +2) bits from 2×8×16 bits as in the conventional bit-string distribution circuit.

In the orthogonal transform processor of the present invention, illustrative four shift registers are disposed between the bit-string distribution circuit and a RAC circuit such that, when bit strings are entered, as delayed cycle by cycle, into eight RACs of the RAC circuit, the Final accumulation results are successively provided from the RACs in the order of F8, F1, F7, F2, F6, F3, F5, F4 for an inverse orthogonal transform. Thus obtained data string for an inverse orthogonal transform is supplied to the butterfly unit. This reduces in number the registers required for a decimation-in-frequency operation for an inverse orthogonal transform.

The butterfly unit of the present invention employs three registers, one multiplexer, and one parallel adder so as to be reduced in circuit arrangement.

The arrangements above-mentioned make it possible to realize a forward-, inverse- and bi-directional orthogonal transform processor in small size, so that integrated orthogonal transform, processors require less chip area. Furthermore, the above-mentioned butterfly unit having a small-scale circuit arrangement executes butterfly operations without changing the order of input data.

DETAILED DESCRIPTION OF THE INVENTION

The following description will discuss one-dimensional DCT processors according to embodiments of the present invention with reference to the attached drawings.

First Embodiment

With reference to FIGS. 1 to 4, the following description will discuss the arrangement of a bi-directional DCT processor according to a first embodiment of the present invention.

Figure 1:
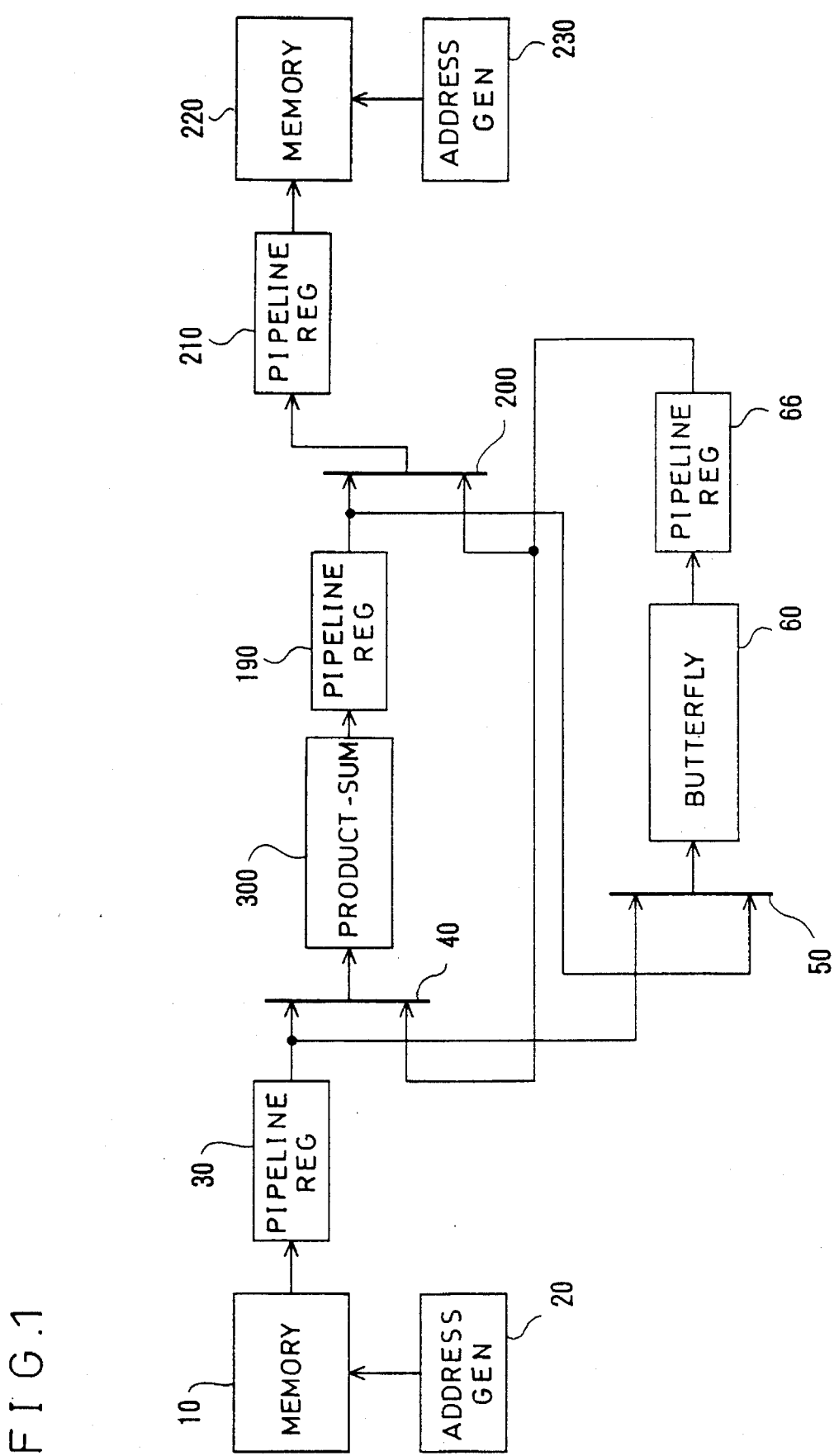
FIG. 1 is a block diagram illustrating the arrangement of a bi-directional DCT processor according to a first embodiment of the present invention.

The bi-directional DCT processor in FIG. 1 comprises a 16bit width memory 10 of 8×8 words, an ad-dress generator 20, a 16-bit width pipeline register 30, a multiplexer 40 having 16-bit width first and second inputs and a 16-bit width output, a product-sum unit 300 having a 16-bit width input and a 34-bit S width output, a 34-bit width pipeline register 190, a multiplexer 50 having a 16-bit width first input, a 34-bit width second input and a 34-bit width output, a butterfly unit 60 having a 34-bit width input and a 16-bit width output, a 16-bit width pipeline register 66, a multiplexer 200 having a 34-bit width first input, a 16-bit width second input and a 16-bit width output, a 16-bit width pipeline register 210, a 16-bit width memory 220 of 8×8 words, and an address generator 230.

Figure 2:
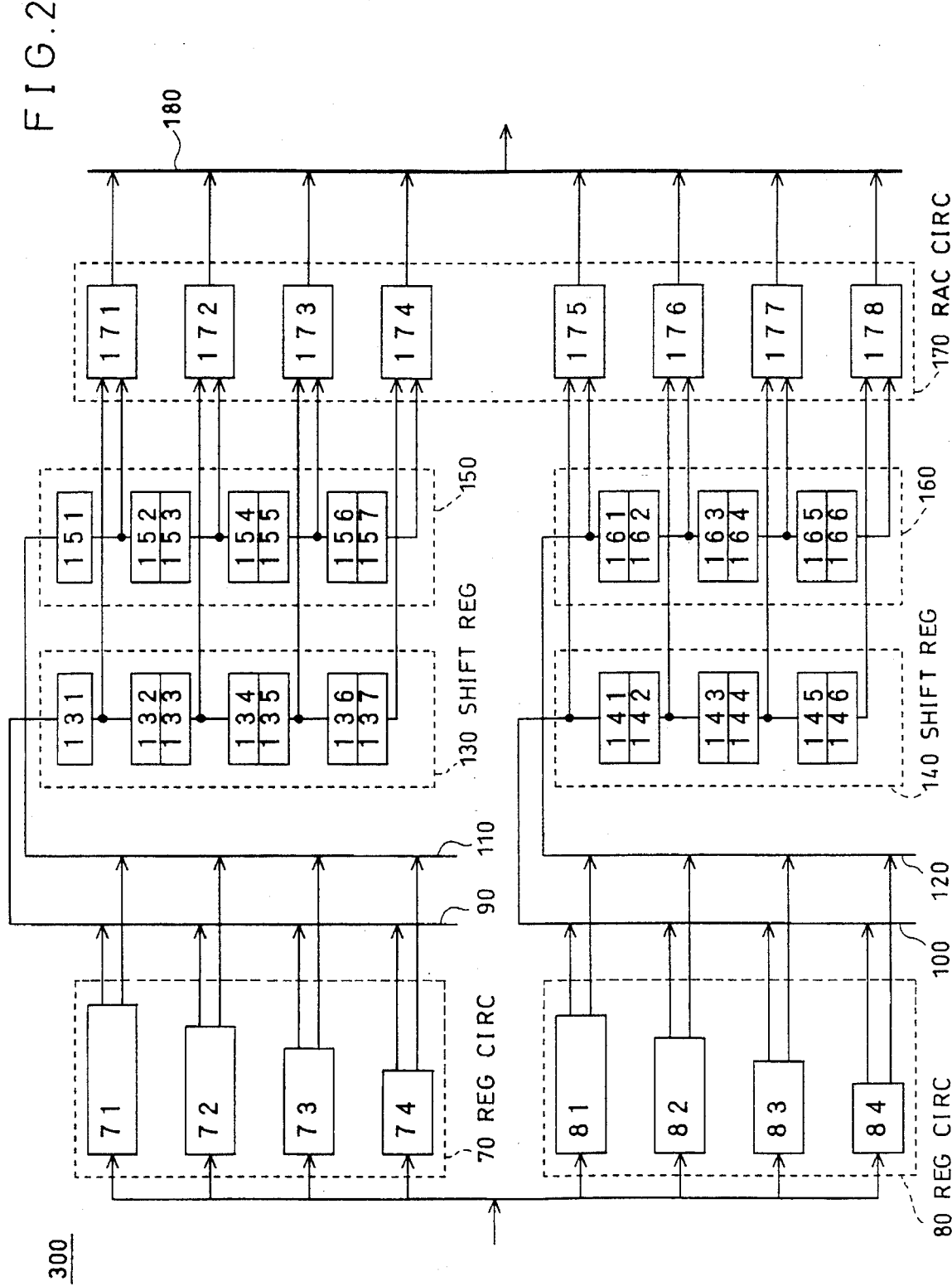
FIG. 2 is a block diagram illustrating the inner arrangement of the product-sum unit in FIG. 1.

In FIG. 2, the product-sum unit 300 comprises a 30-bit width bit shift register 71, a 26-bit width bit shift register 72, a 22-bit width bit shift register 73, a 18-bit width bit shift register 74, a 28-bit width bit shift register 81, a 24-bit width bit shift register 82, a 20-bit width bit shift register 83, a 16-bit width bit shift register 84, a register circuit 70 comprising the bit shift registers 71 to 74, and a register circuit 80 comprising the bit shift registers 81 to 84. Each of the bit shift registers of the register circuit 70 is arranged to shift out bits by two bits in the order from the LSB to the MSB, and each of the bit shift registers of the register circuit 80 is arranged to shift out bits by two bits in the order from the LSB to the MSB. The product-sum unit 300 further comprises a 4-bit width bus 90, a 4-bit width bus 100, a 4-bit width bus 110, and a 4-bit width bus 120. The upper bit outputs (an upper bit slice word) of all of the registers of the register circuit 70 are collected to the bus 90, the lower bit outputs (a lower bit slice word) of all of the registers of the register circuit 70 are collected to the bus 110, the upper bit outputs (an upper bit slice word) of all of the registers of the register circuit 80 are collected to the bus 100, and the lower bit outputs (a lower bit slice word) of all of the registers of the register circuit 80 are collected to the bus 120. A shift register 130 comprises seven 4-bit width registers 31 to 137, a shift register 150 comprises seven 4-bit width registers 151 to 157, a shift register 140 comprises six 4-bit width registers 141 to 146, a shift register 160 comprises six 4-bit width registers 161 to 166, a ROM and accumulator circuit (RAG circuit) 170 comprises eight RACs 171 to 178 each having 4-bit width first and second inputs and a 34-bit width output for accumulating the partial products of the bi-directional DCT according to the distributed arithmetic, and a multiplexer 180 has 34-bit width first to eighth inputs and a 34-bit width output.

Figure 3:
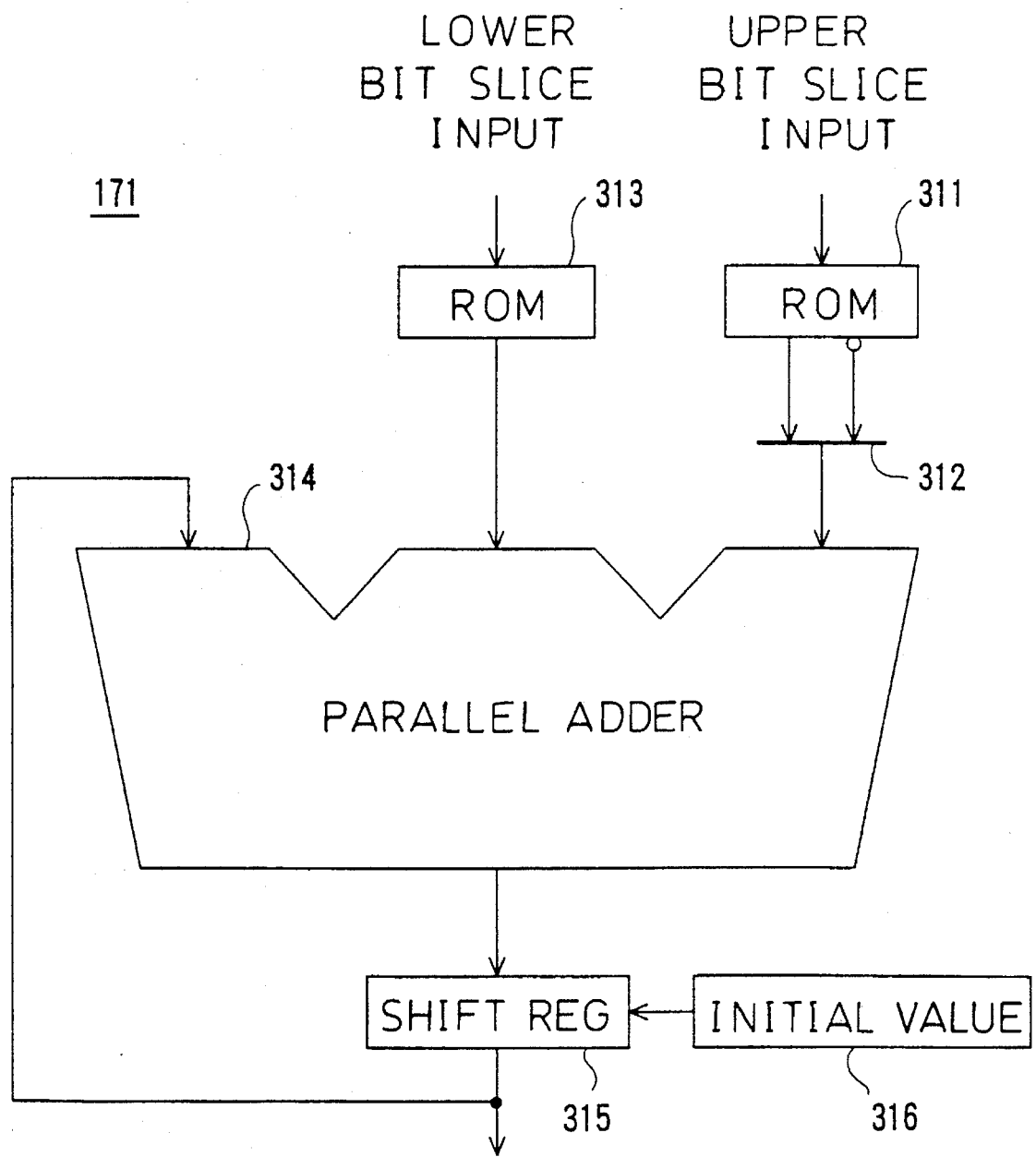
FIG. 3 is a block diagram illustrating the inner arrangement of one of the RACs in FIG. 2.

In FIG. 3, the RAC 171 comprises: a ROM 311 which has positive and negative outputs and into which the upper bit slice words are entered as 4-bit width addresses from the shift register 130; a multiplexer 312 having 16-bit width first and second inputs and a 16-bit width output; a ROM 313 into which the lower bit slice words are entered as 4-bit width addresses from the shift register 150; a parallel adder 314 having 16-bit width first and second inputs, a 34-bit width third input and a 34-bit width output; a 34-bit width shift register 315; and an initial value setting device 316 disposed for the shift register 315. The ROMs 311, 313 contain, in the form of look-up tables, the partial sums of vector inner products based on discrete cosine matrices for forward and inverse DCTs. The multiplexer 312 selects one of the outputs of the ROM 811 in order to subtract the last bit slice word of the MSBs for executing two's complement operations. The parallel adder 314 and the shift register 315 form an accumulator for adding, with the digits aligned, the partial sums retrieved from the ROMs 311, 313.

Figure 4:
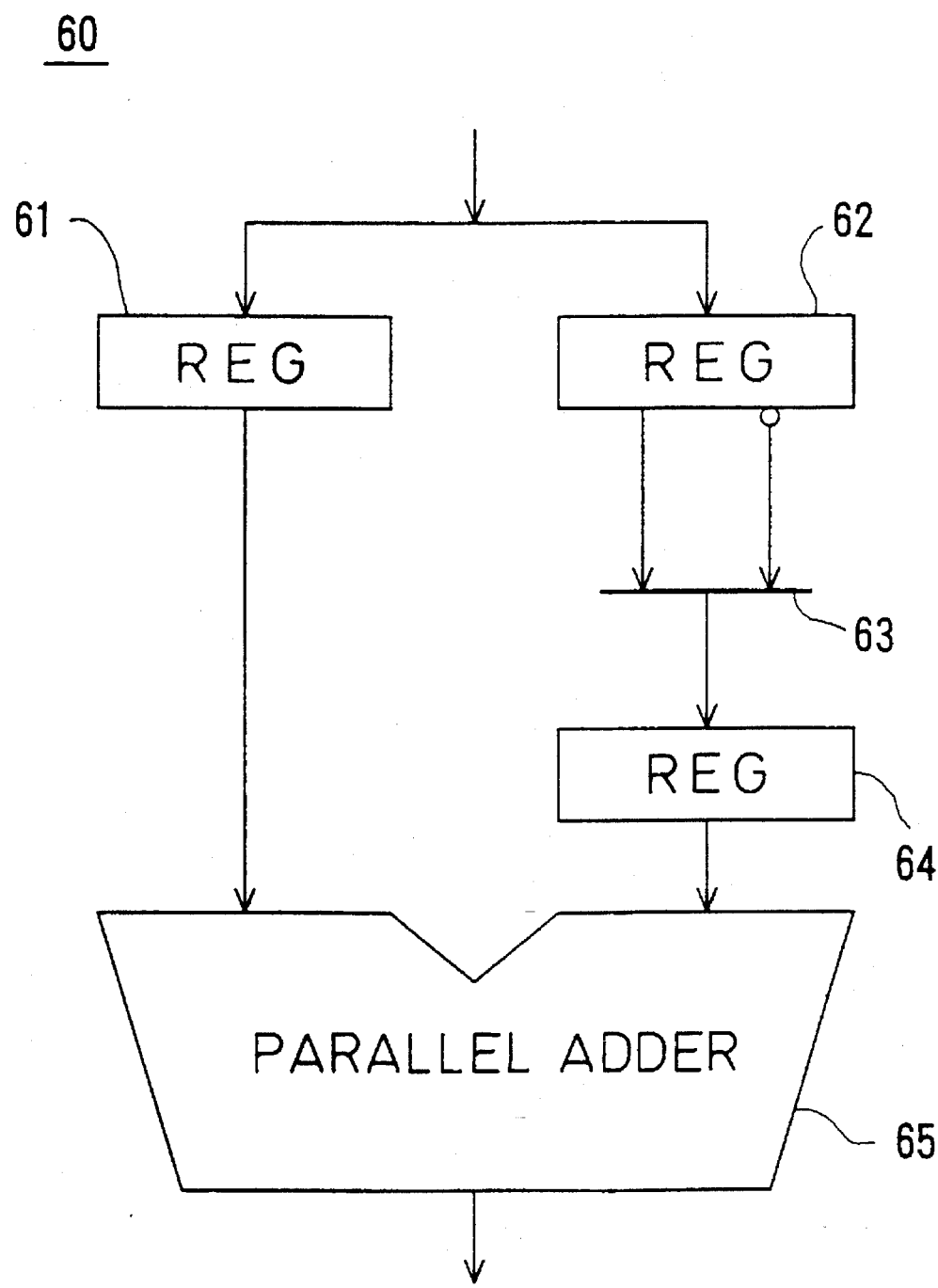
FIG. 4 is a block diagram illustrating the inner arrangement of the butterfly unit in FIG. 1.

In FIG. 4, the butterfly unit 60 comprises a 34-bit width register 61, a 34-bit width register 62 having positive and negative outputs, a multiplexer 63 having 34-bit width first and second inputs and a 34-bit width output, a 34-bit width register 64, and a parallel adder 65 having 34-bit width first and second inputs and a 16-bit width output.

Figure 5:
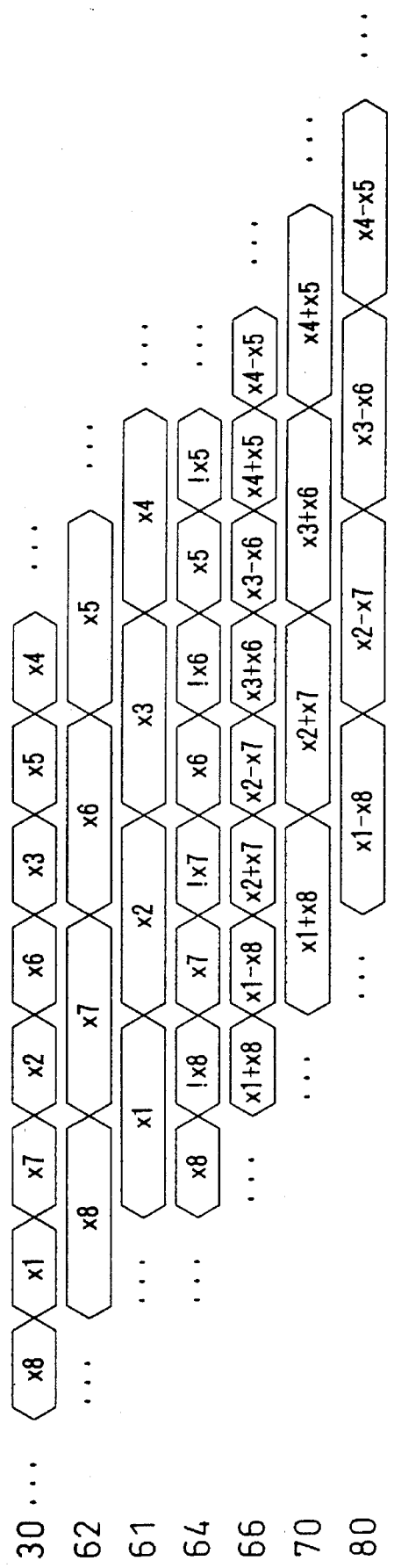
FIGS. 5, 6, and 7 are timing charts of forward operations of the bi-directional DCT processor in FIG. 1.
Figure 6:
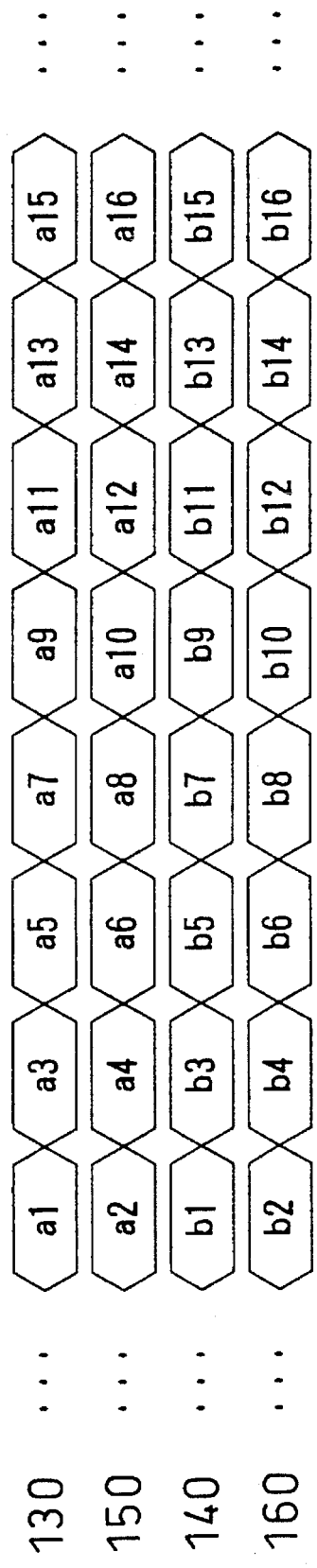
Figure 7:
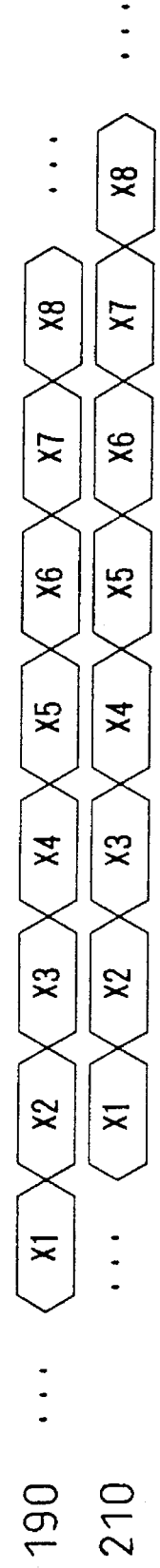

The following description will discuss a forward DCT operation of the bi-directional DCT processor of FIG. 1 with reference to FIGS. 5 to 7. In the forward DCT, the multiplexer 40 selects the output of the pipeline register 66, the multiplexer 50 selects the output of the pipeline register 30, and the multiplexer 200 selects the output of the pipeline register 190.

The address generator 20 reads out a data string x1 to x8 in the order of x8, x1, x7, x2, x6, x3, x5, x4 per one cycle from the memory 10, and the output of the memory 10 is entered into the pipeline register 80. The output of the pipeline register 30 is selected by the multiplexer 50, which in turn outputs the data string x1 to x8 in the order of x8, x1, x7, x2, x6, x3, x5, x4 per one cycle. A data string including x5 to x8 is stored in the register 62 of the butterfly unit 60 in the order of x8, x7, x6, x5 per two cycles. Further, a data string including x1 to x4 is stored in the register 61 of the butterfly unit 60 in the order of x1, x2, x3, x4 per two cycles.

In the butterfly unit 60, a data string x5 to x8 is supplied in the order of x8, x7, x6, x5 per two cycles from the positive output of the register 62, and an inversed data string !x5 to !x8 of the data string x5 to x8 is supplied in the order of !x8, !x7, !x6, !x5 per two cycles from the negative output of the register 62. The multiplexer 63 selects alternately the data string x5 to x8 and the data string !x5 to !x8 respectively supplied from the positive and negative outputs of the register 62, in the order of x8, !x8, x7, !x7, x6, !x6, x5, !x5, and the output of the multiplexer 63 is stored in the register 64. The parallel adder 65 adds the outputs of the registers 61, 64 to supply data x1+x8, x1–x8, x2+x7, x2–x7, x3+x6, x3–x6, x4+x5, x4–x5 per one cycle, and the output of the parallel adder 65 is stored in the pipeline register 66.

The pipeline register 66 supplies data x1+x8, x1−x8, x2+x7, x2−x7, x3+x6, x3−x6, x4+x5, x4−x5, and the output of the pipeline register 66 is selected by the multiplexer 40. In the product-sum unit 300, the data x1+x8 is entered into the register 71, the data x1−x8 is entered into the register 81, the data x2+x7 is entered into the register 72, the data x2−x7 is entered into the register 82, the data x3+x6 is entered into the register 73, the data x3−x6 is entered into the register 83, the data x4+x5 is entered into the register 74, and the data x4−x5 is entered into the register 84. Thus, the data x1+x8, x2+x7, x3+x6, x4+x5 are stored in the register circuit 70, and the data x1−x8, x2−x7, x3−x6, x4−x5 are stored in the register circuit 80. At this time, the data are respectively entered, as justified on the left side, into the eight registers 71 to 74 and 81 to 84 forming the register circuits 70, 80 successively with the largest bit-width register first. Each of the eight registers shifts out two bits per cycle in the order from the LSB to the MSB. Accordingly, when the 16-bit width register 84 is filled up with the 16-bit data x4−x5, each of the data in other registers 71 to 74 and 81 to 83 is justified on the right side and all the registers 71 to 74 and 81 to 84 concurrently shift out two bits at the next cycle. When two bits out of the 16-bit data x1+x8 are shifted out from the bit width register 71, a 16-bit width blank is formed in the register 71, so that the data x1+x8 derived from the next data string can immediately be written in this blank.

In the product-sum unit 300, the bit shift registers 71 to 74 of the register circuit 70 which hold the data x1+x8, x2+x7, x3+x6, x4+x5, successively shift out the respective least significant two bits per cycle. The respective upper bits out of these least significant two bits are supplied, as an upper bit slice data string a1, a3, . . . a13, a15, to the bus 90, and the respective lower bits out of the aforementioned least significant two bits are supplied, as a lower bit slice data string a2, a4, . . a14, a16, to the bus 110. Also, in the product-sum unit 300, the bit shift registers 81 to 84 of the register circuit 80 which hold the data x1−x8, x2−x7, x3−x6, x4−x5, successively shift out the respective least significant two bits per cycle. The respective upper bits out of these least significant two bits are supplied, as an upper bit slice data string b1, b3, . . . b13, b15, to the bus 100, and the respective lower bits out of the aforementioned least significant two bits are supplied, as a lower bit slice data string b2, b4, . . . b14, b16, to the bus 120. The data string a1, a3, . . . a13, a15 supplied from the register circuit 70 is entered into the shift register 130, the data string a2, a4, . . . a14, a16 supplied from the register circuit 70 is entered into the shift register 150, the data string b1, b3, . . . b13, b15 supplied from the register circuit 80 is entered into the shift register 140, and the data string b2, b4, . . . b14, b16 supplied from the register circuit 80 is entered into the shift register 160. The data of the data string a1, a3, . . . a13, a15 entered into the shift register 130 are entered into the first input of the RAC 171 after one cycle, into the first input of the RAC 172 after three cycles, into the first input of the RAG 173 after five cycles, and into the first input of the RAC 174 after seven cycles. The data of the data string a2, a4, . . . a14, a16 entered into the shift register 150 are entered into the second input of the RAC 171 after one cycle, into the second input of the RAC 172 after three cycles, into the second input of the RAC 173 after five cycles, and into the second input of the RAC 174 after seven cycles. The data of the data string b1, b3, . . . b13, b15 entered into the shift register 140 is entered into the first input of the RAG 175 after zero cycle, into the first input of the RAC 176 after two cycles, into the first input of the RAC 177 after four cycles, and into the first input of the RAC 178 after six cycles. The data of the data string b2, b4, . . . b14, b16 entered into the shift register 160 are entered into the second input of the RAC 175 after zero cycle, into the second input of the RAC 176 after two cycles, into the second input of the RAC 177 after four cycles, and into the second input of the RAG 178 after six cycles. The RACs 171 to 174 of the RAC circuit 170 accumulate, per cycle, the partial products corresponding to the data string a1, a3, . . . a13, a15 and the data string a2, a4, . . . a14, a16 for a period of eight cycles. The RACs 175 to 178 of the RAC circuit 170 accumulate, per cycle, the partial products corresponding to the data string b1, b3, . . . b13, b15 and the data string b2, b4, . . . b14, b16 for a period of eight cycles. As a result, the final accumulation results X1, X2, X3, X4, X5, X6, X7, X8 are supplied, per cycle, from the RAG circuit 170 in the order of RACs 175, 171, 176, 172, 177, 173, 178, 174. The multiplexer 180 selects, per cycle, the data X1, X2, X3, X4, X5, X6, X7, X8, and the output of the multiplexer 180 is entered into the pipeline register 190.

The multiplexer 200 selects the output of the pipeline register 190, and the output of the multiplexer 200 is entered into the next-stage pipeline register 210. The data X1, X2, X3, X4, X5, X6, X7, X8 are entered, per cycle, into the memory 220 and the address generator 230 generates addresses such that the data X1, X2, X3, X4, X5, X6, X7, X8 are stored by continuous addresses in the memory 220.

The aforementioned operations are carried out for eight rows in a pipelined fashion to achieve a forward one-dimensional DCT.

Figure 8:
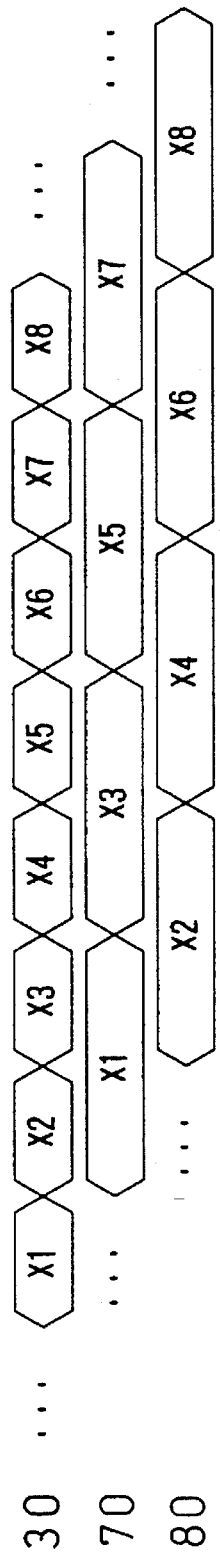
FIGS. 8, 9, and 10 are timing charts of inverse operations of the bi-directional DCT processor in FIG. 1.
Figure 9:
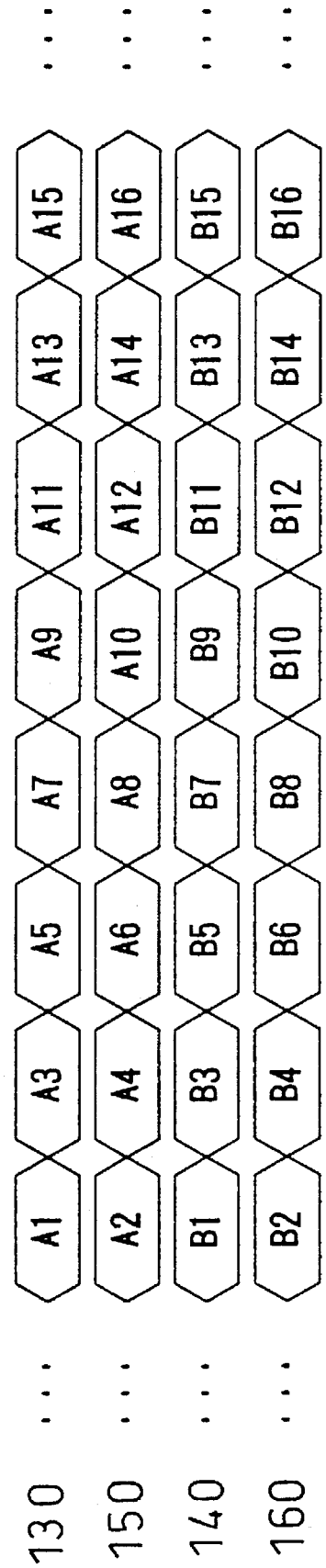
Figure 10:
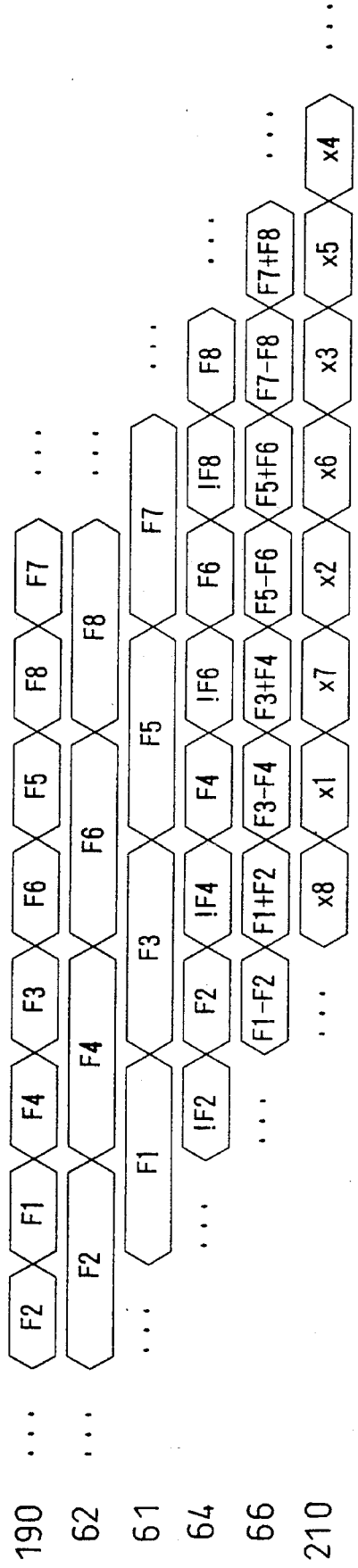

The following description will discuss an inverse DCT operation of the bi-directional DCT processor of FIG. 1 with reference to FIGS. 8 to 10. In the inverse DCT, the multiplexer 40 selects the output of the pipeline register 30, the multiplexer 50 selects the output of the pipeline register 190, and the multiplexer 200 selects the output of the pipeline register 66.

The address generator 20 reads out a data string X1 to X8 in the order of X1, X2, X3, X4, X5, X6, X7, X8 per one cycle from the memory 10, and the output of the memory 10 is entered into the pipeline register 30. The pipeline register 30 supplies the data X1, X2, X3, X4, X5, X6, X7, X8. The output of the pipeline register 30 is selected by the multiplexer 40. In the product-sum unit 300, the data X1 is entered into the register 71, the data X2 is entered into the register 81, the data X3 is entered into the register 72, the data X4 is entered into the register 82, the data X5 is entered into the register 73, the data X6 is entered into the register 83, the data X7 is entered into the register 74, and the data X8 is entered into the register 84. Thus, the data X1, X3, X5, X7 are stored in the register circuit 70, and the data X2, X4, X6, X8 are stored in the register circuit 80.

In the product-sum unit 300, the bit shift registers 71 to 74 of the register circuit 70 which hold the data X1, X3, X5, X7, successively shift out the respective least significant two bits per cycle. The respective upper bits out of these least significant two bits are supplied, as an upper bit slice data string A1, A3, . . . A13, A15, to the bus 90, and the respective lower bits out of the aforementioned least significant two bits are supplied, as a lower bit slice data string A2, A4, . . . A14, A16, to the bus 110. Also, in the product-sum unit 300, the bit shift registers 81 to 84 of the register circuit 80 which hold the data X2, X4, X6, X8, successively shift out the respective least significant two bits per cycle. The respective upper bits out of these least significant two bits are supplied, as an upper bit slice data string B1, B3, . . . B13, B15, to the bus 100, and the respective lower bits out of the aforementioned east significant two bits are supplied, as a lower bit slice data string B2, B4, ... B14, B16, to the bus 120. The data string A1, A3, ... A13, A15 supplied from the register circuit 70 is entered into the shift register 130, the data string A2, A4, ... A14, A16 supplied from the register circuit 70 is entered into the shift register 150, the data string B1, B3, ... B13, B15 supplied from the register circuit 80 is entered into the shift register 140, and the data string B2, B4, ... B14, B16 supplied from the register circuit 80 is entered into the shift register 160. The data of the data string A1, A3, ... A13, A15 entered into the shift register 130 are entered into the first input of the RAC 171 after one cycle, into the first input of the RAG 172 after three cycles, into the first input of the RAG 173 after five cycles, and into the first input of the RAC 174 after seven cycles. The data of the data string A2, A4, ... A14, A16 entered into the shift register 150 are entered into the second input of the RAC 171 after one cycle, the second input of the RAC 172 after three cycles, into the second input of the RAG 173 after five cycles, and into the second input of the RAG 174 after seven cycles. The data of the data string B1, B3, ... B13, B15 entered into the shift register 140 are entered into the first input of the RAG 175 after zero cycle, into the first input of the RAC 176 after two cycles, into the first input of the RAG 177 after four cycles, and into the first input of the RAC 178 after six cycles. The data of the data string B2, B4, B14, B16 entered into the shift register 160 are entered into the second input of the RAC 175 after zero cycle, into the second input of the RAC 176 after two cycles, into the second input of the RAC 177 after four cycles, and into the second input of the RAC 178 after six cycles. The RACs 171 to 174 of the RAG circuit 170 accumulate, per cycle, the partial products corresponding to the data string A1, A3, ... A13, A15 and the data string A2, A4, ... A14, A16 for a period of eight cycles. The RACs 175 to 178 of the RAC circuit 170 accumulate, per cycle, the partial products corresponding to the data string B1, B3, ... B13, B15 and the data string B2, B4, .. . B14, B16 for a period of eight cycles. As a result, the final accumulation results F2, F1, F4, F3, F6, F5, F8, F7 are supplied, per cycle, from the RAC circuit 170 in the order of the RACs 175, 171, 176, 172, 177, 173, 178, 174. The multiplexer 180 selects, per cycle, the data F2, F1, F4, F3, F6, F5, F8, F7, and the output of the multiplexer 180 is entered into the pipeline register 190.

The output of the pipeline register 190 is selected by the multiplexer 50, which in turn outputs the data string F1 to F8 in the order of F2, F1, F4, F3, F6, F5, F8, F7 per one cycle. The data F2, F4, F6, F8 are stored in the register 62 of the butterfly unit 60 per two cycles, and the data F1, F3, F5, F7 are stored in the register 61 of the butterfly unit 60 per two cycles.

In the butterfly unit 60, the data F2, F4, F6, F8 are supplied per two cycles from the positive output of the register 62, and the inversed data !F2, !F4, !F6, !F8 of the data F2, F4, F6, F8 are supplied in this order per two cycles from the negative output of the register 62. The multiplexer 63 selects alternately the data string F2, F4, F6, F8 and the data string !F2, !F4, !F6, !F8 respectively supplied from the positive and negative outputs of the register 62, in the order of !F2, F2, !F4, F4, !F6, F6, !F8, F8, and the output of the multiplexer 63 is stored in the register 64. The parallel adder 65 adds the outputs of the registers 61, 64 to supply data x8=F1−F2, x1=F1+F2, x7=F3−F4, x2=F3+F4, x6=F5−F6, x3=F5+F6, x5=F7−F8, x4=F7+F8 per one cycle, and the output of the parallel adder 65 is stored in the pipeline register 66.

The multiplexer 200 selects the output of the pipeline register 66, and the output of the multiplexer 200 is entered into the next-stage pipeline register 210. The data x8, x1, x7, x2, x6, x3, x5, x4 are entered, per cycle, into the memory 220 and the address generator 250 generates addresses such that the data x1, x2, x3, x4, x5, x6, x7, x8 are stored by continuous addresses in the memory 220.

The aforementioned operations are carried out for eight rows in a pipelined fashion to achieve an inverse one-dimensional DCT.

Second Embodiment

Figure 11:
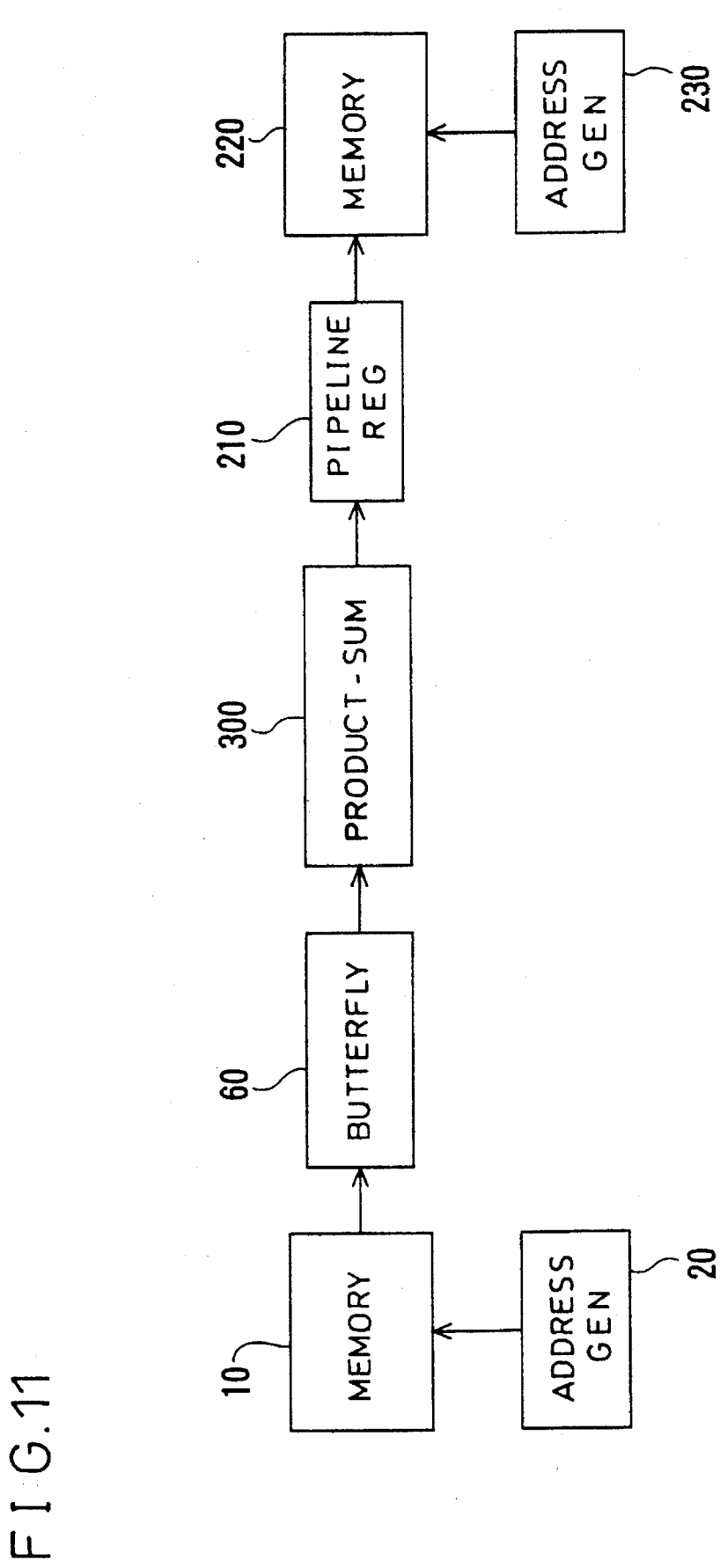
FIG. 11 is a block diagram illustrating the arrangement of a forward DCT processor according to a second embodiment of the present invention.

As shown in FIG. 11, a forward DCT processor according to a second embodiment of the present invention has an arrangement similar to that shown in FIG. 1 except for the following points. In the second embodiment, there are not disposed three pipeline .registers 30, 66, 190 and three multiplexers 40, 50, 200 in FIG. 1, the output of a memory 10 is connected directly to the input of a butterfly unit 60, the output of the butterfly unit 60 is connected directly to the input of a product-sum unit 800 and the output of the product-sum unit 800 is connected directly to a pipeline register 210. The second embodiment employs a bit width suitable for the operational precision of a forward DCT. That is, the input of the butterfly unit 60 has a 16-bit width and the output of the product-sum unit 300 has also a 16-bit width. A RAC circuit 170 stores the partial sums of vector inner products solely for a forward DCT.

The operation of the forward DCT processor in FIG. 11 will be apparent from the aforementioned description of the forward DCT operation in connection with the bi-directional DCT processor in FIG. 1.

Third Embodiment

Figure 12:
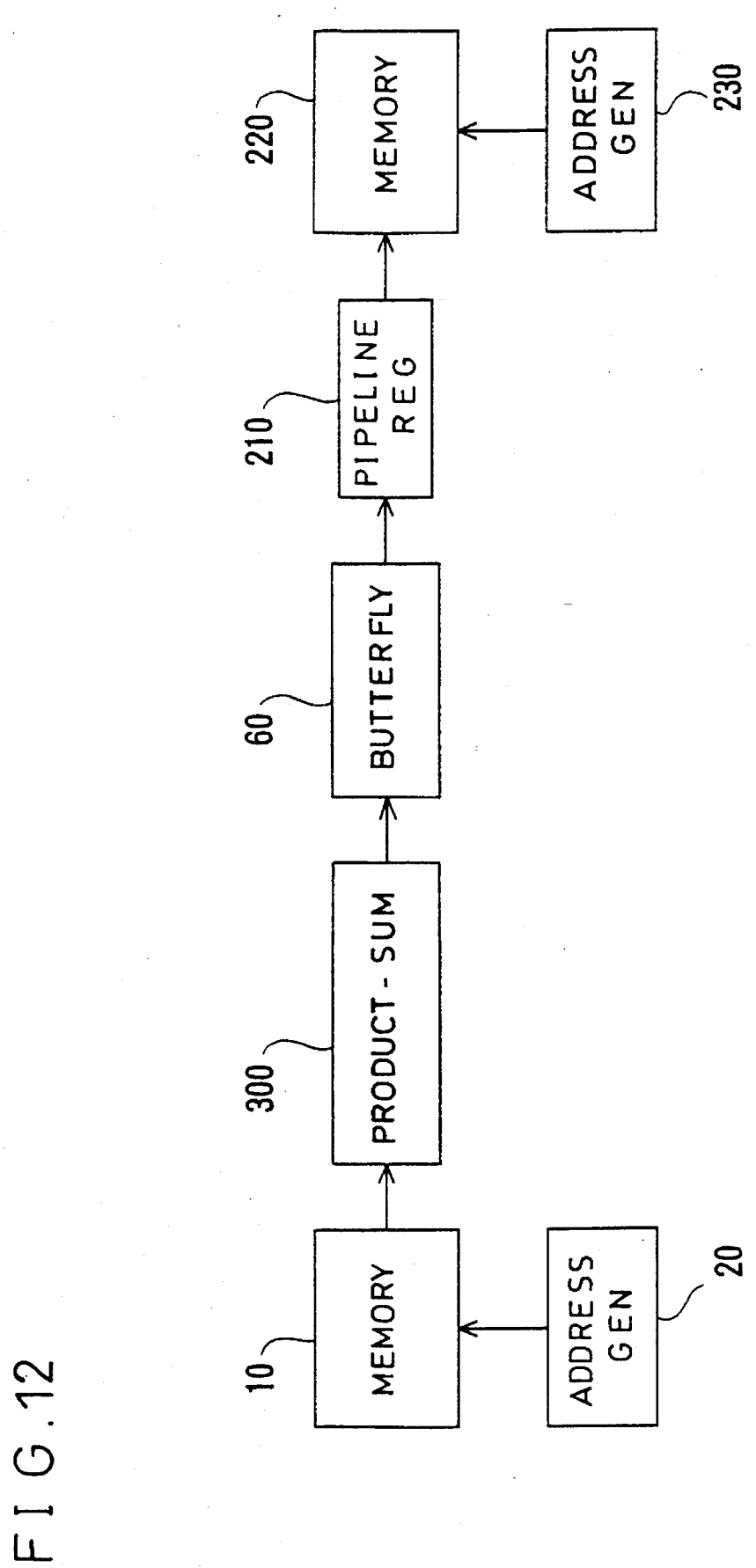
FIG. 12 is a block diagram illustrating an inverse DCT processor according to a third embodiment of the present invention.

As shown in FIG. 12, an inverse DCT processor according to a third embodiment of the present invention has an arrangement similar to that shown in FIG. 1 except for the following points. In the third embodiment, there are not disposed three pipeline registers 30, 66,190 and three multiplexers 40, 50, 200 in FIG. 1, the output of a memory 10 is connected directly to the input of a product-sum unit 300, the output of the product-sum unit 300 is connected directly to the input of a butterfly unit 60 and the output of the butterfly unit 60 is connected directly to a pipeline register 210. In the third embodiment, each of the output of the product-sum unit 300 and the input of the butterfly unit 60 has a 34-bit width. A RAG circuit 170 stores the partial sums of vector inner products solely for an inverse DCT.

The operation of the inverse DCT processor in FIG. 12 will be apparent from the aforementioned description of the inverse DCT operation in connection with the bi-directional DCT processor in FIG. 1.

Each of the first to third embodiments has been described in terms of the DCT. However, the present invention may be applicable in other orthogonal transforms.

We claim:

1. A bi-directional orthogonal transform processor comprising:

a first memory for holding two-dimensional element data;

a first address generator having an address output connected to an address input of said first memory;

a butterfly unit, and first and second multiplexers each having first and second inputs, an output of said first memory being connected to said first inputs of said first and second multiplexers, an output of said second multiplexer being connected to an input of said butterfly unit, an output of said butterfly unit being connected to said second input of said first multiplexer;

first and second register circuits each comprising N/2 bit shift registers (in which N is an even number) wherein P bits are shifted out (in which P is an integer) in the order from the least significant bit to the most significant bit and which are different in width from one another, an output of said first multiplexer being connected to inputs of said bit shift registers of said first and second register circuits;

a plurality of buses wherein the number of buses is 2P, the P-bit outputs of all registers of said first register circuit being collected to said first, third, ... (2P-1)th buses, the P-bit outputs of all registers of said second register circuit being collected to said second, fourth, ... 2Pth buses;

first, third, ... (2P-1)th shift registers comprising (N-1) registers having the same bit width, and second, fourth, ... 2Pth shift registers comprising (N-2) registers having the same bit width, said first, third, ... (2P-1)th buses being connected to inputs of said first, third ... (2P-1)th shift registers, said second, fourth ... 2Pth buses being connected to inputs of said second, fourth, ... 2Pth shift registers;

a RAC (ROM and accumulator) circuit having P inputs and comprising N RAGs for accumulating partial products of an orthogonal transform according to distributed arithmetic, first to Pth outputs of the first, third, ... (N-1)th registers of said first, third ... (2P-1)th shift registers being connected to first to Pth inputs of the first, second ... N/2th RACs of said RAC circuit, said second, fourth, ... 2Pth buses being connected to an input of the (N/2+1)th RAC of said RAC circuit, first to Pth outputs of the second, fourth ... (N−2)th registers of said second, fourth ... 2Pth shift registers being connected to first to Pth inputs of the (N/2+2)th, (N/2+3)th, ... Nth RAGs of said RAC circuit;

an N-input multiplexer having N inputs to which outputs of said RAC circuit is connected;

a third multiplexer, an output of said N-input multiplexer being connected to said second input of said second multiplexer and a first input of said third multiplexer, said output of said butterfly unit being connected further to a second input of said third multiplexer;

a second memory for holding two-dimensional element data, an output of said third multiplexer being connected to an input of said second memory;

and a second address generator having an address output connected to an address input of said second memory.

2. A forward orthogonal transform processor having an arrangement similar to that of said bi-directional orthogonal transform processor set forth in claim 1, except that:

said first, second and third multiplexers are not disposed;

said output of said first memory is connected to said input of said butterfly unit;

said output of said butterfly unit is connected to said inputs of said first and second register circuits; and said output of said N-input multiplexer is connected to said input of said second memory.

3. An inverse orthogonal transform processor having an arrangement similar to that of said bi-directional orthogonal transform processor set forth in claim 1, except that:

said first, second and third multiplexers are not disposed;

said output of said first memory is connected to said inputs of said first and second register circuits;

said output of said N-input multiplexer is connected to said input of said butterfly unit; and said output of said butterfly unit is connected to said input of said second memory.

* * * * *